July 18, 1961 W. STOLK ET AL 2,992,554
HARDNESS SENSING DEVICE
Filed Nov. 20, 1956 3 Sheets-Sheet 1
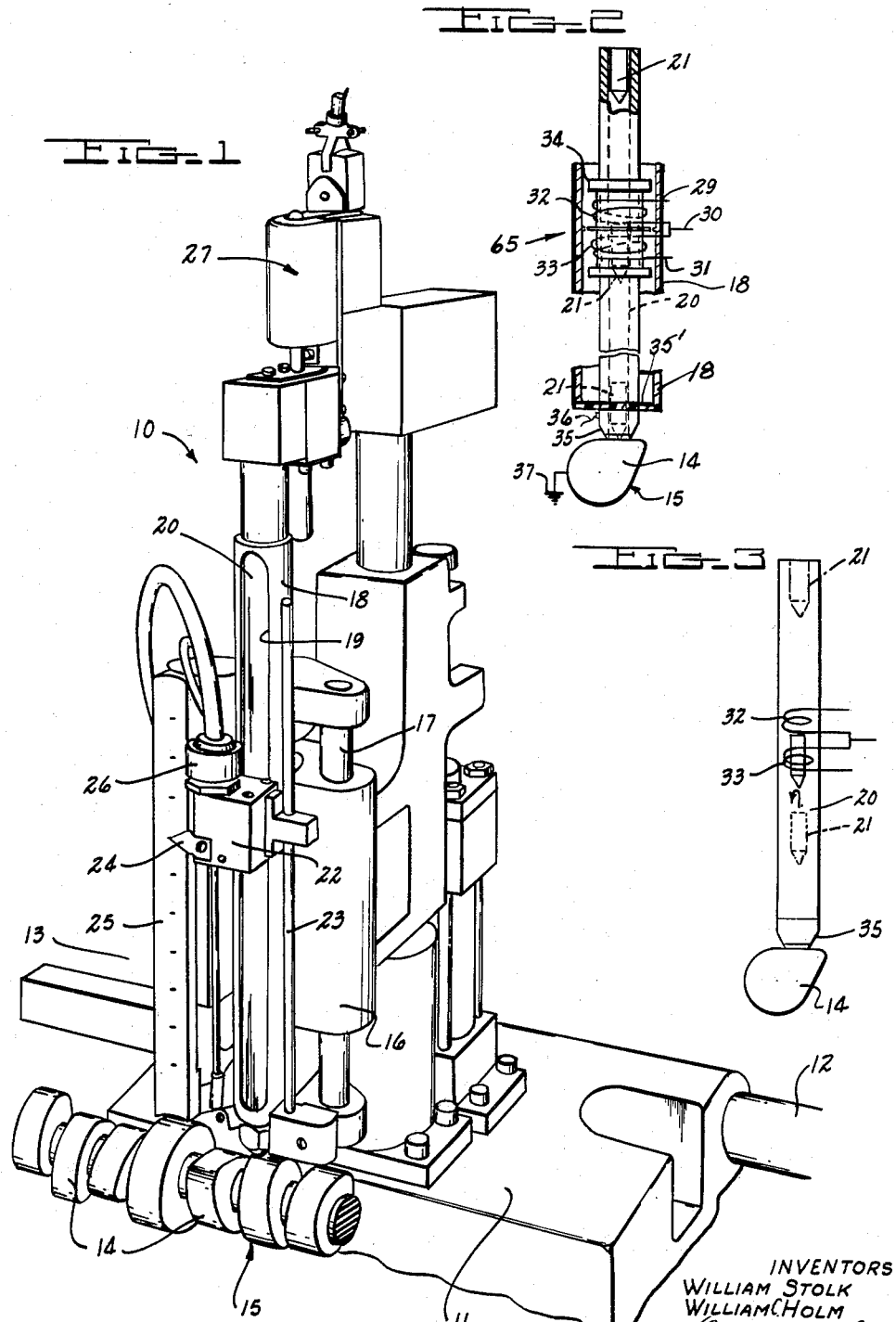
INVENTORS
WILLIAM STOLK
WILLIAM C. HOLM
ATTORNEYS

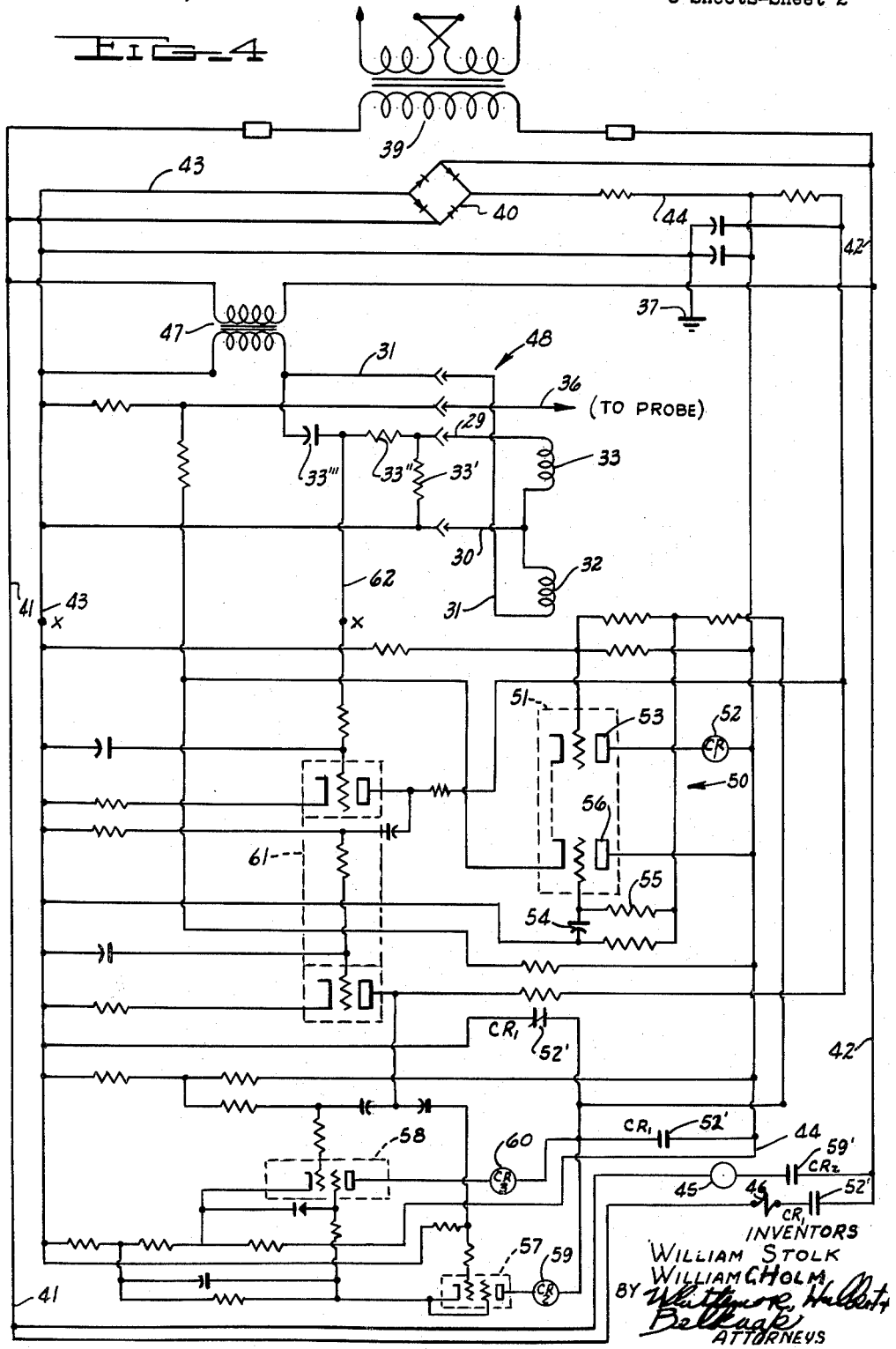

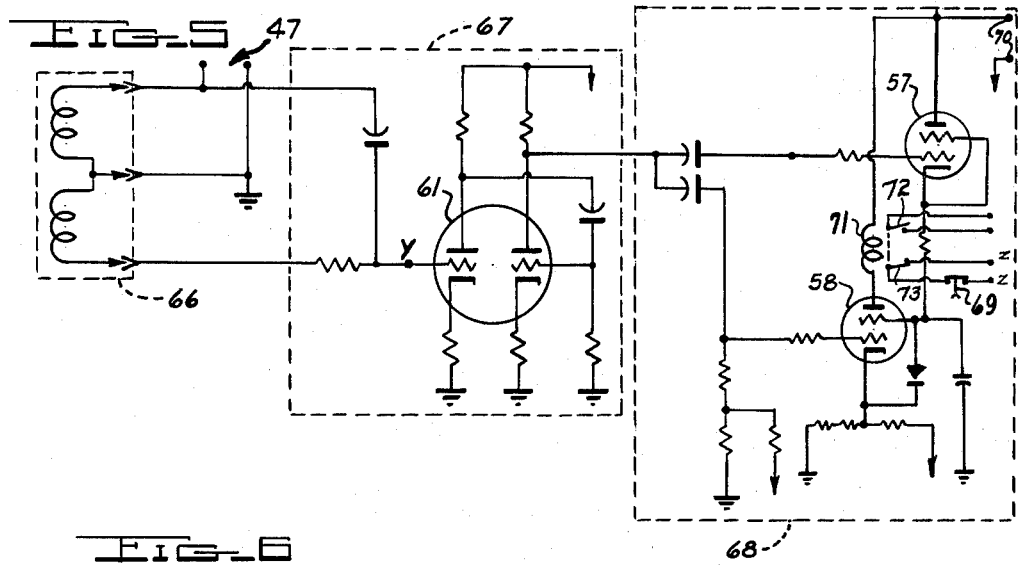
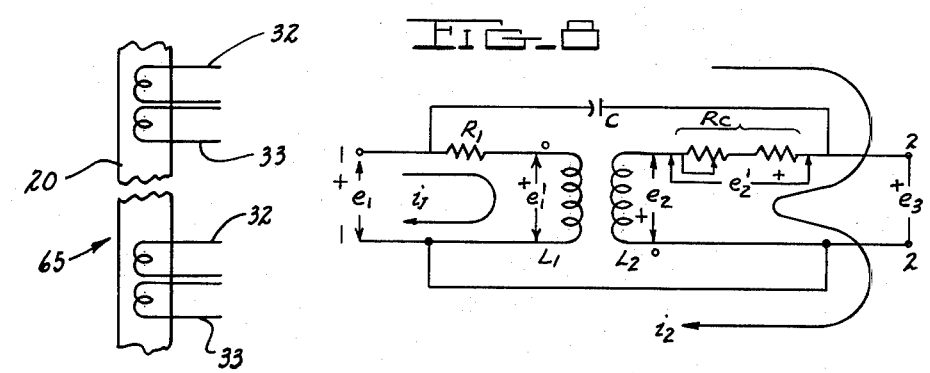
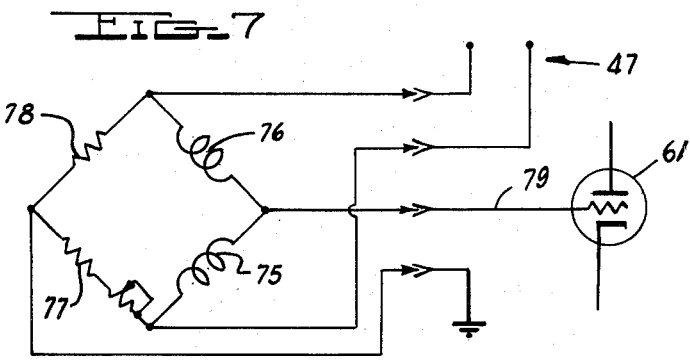
INVENTORS
WILLIAM STOLK
WILLIAM C. HOLM

United States Patent Office 2,992,554
Patented July 18, 1961

2,992,554
HARDNESS SENSING DEVICE
William Stolk, Lansing, and William C. Holm, East Lansing, Mich., assignors to Machine Tool Electric Corp., Lansing, Mich., a corporation of Michigan
Filed Nov. 20, 1956, Ser. No. 623,437
12 Claims. (Cl. 73—79)

The present invention relates to an improved sensing device suitable for use in electronically operated apparatus for sensing or testing the hardness of metal parts under the scleroscope principle of judging hardness by reference to the height of rebound of a falling hammer element.

A general object of the invention is to provide a novel sensing method and a circuit for carrying it into effect, including a coil unit whose coupling is altered in response to the presence or proximity relative thereto of an object having magnetic properties. In accordance with the illustrated adaptation of the circuit to a testing device, the alteration occurs in response to the fall and rebound of an impact hammer, however, other applications of the principle will occur to those skilled in the art.

A further object is to provide such a sensing circuit employing a pair of coils, or dual pairs of coils, whose respective mutual inductance is altered to afford a signal indicating such relative presence or proximity.

Yet another object is to provide a scleroscope type testing device including a sensing coil or coil unit to detect fall and rebound of its hammer or like element.

A further object is to provide a practical apparatus which is entirely automatic in its operation from start to finish of a series of testing cycles performed at various points along the length of a tested object, for example an automobile cam shaft.

Yet another object is to provide testing apparatus in which the height of rebound of a hammer element, as sensed by the improved circuit, is effective through an electronic circuit to initiate "accept" and "reject" signals.

Yet another object is to provide apparatus which is electronically responsive in affording "accept" and "reject" signals, as described, and in which the automatic indexing movement of the sensing unit of the apparatus is also controlled in response to the electronically derived signals governed by the action of the scleroscope hammer, the initiation and termination of each of a series of test cycles following indexing being controlled in the main through the electronic circuit of the apparatus.

The foregoing as well as other objects will be made more apparent as this description proceeds, especially when considered in connection with the accompanying drawings, wherein:

FIG. 1 is a fragmentary perspective view of the improved electronic sensing apparatus of the invention;

FIGS. 2 and 3 are schematic views in elevation of the scleroscope and sensing coil arrangement of the apparatus, different positions of the gravity hammer of the sensing unit being indicated in solid, dot-dash and dotted lines, respectively;

FIG. 4 is a schematic wiring diagram of the improved electronic control circuit of the apparatus;

FIG. 5 is a more simplified, block-type wiring diagram of the sensing circuit and associated electronic equipment, indicating basic components thereof;

FIG. 6 is a conventionalized figure, along the model of FIGS. 2 and 3, illustrating an alternative modification employing two sets of the dual-coil sensing units for the purpose of signaling, for example, rejectability by reason of excessive hardness, as well as insufficient hardness, and acceptability of an object of desired hardness;

FIG. 7 is a simplified schematic wiring diagram illustrating a further modified adaptation of the invention as applied to a scleroscope hardness testing device, in which only a single sensing coil is applied to the hammer drop tube; and FIG. 8 is a schematic layout to assist in an understanding of the derivation of values of circuit components.

Referring first to FIG. 1 for an illustration of the general arrangement of parts of the improved automatic sensing or testing apparatus 10 of the invention, it comprises an operating assembly mounted on a hydraulically powered base 11, which travels on horizontal slideways 12 of a supporting frame 13. Through appropriately controlled instrumentalities (not shown) the base is successively indexed along the length of the frame 13 upon the completion of each of a series of testing operations performed, for example on the successive hardened steel cam elements 14 of an automotive cam shaft 15. This part is appropriately mounted on the machine frame by provisions which will complete a ground circuit through the frame, in a known manner, and as hereinafter referred to.

The apparatus 10 may include means to mount the testing head 16 thereof for vertical shifting movement following the completion of each test cycle, for example in the form of a vertical slide rod 17 on the apparatus which slidably receives the testing head. Likewise, appropriate mechanical provisions are made for successively elevating and lowering the head prior to and following longitudinal indexing movements. Such means constitutes no part of the present invention, hence has not been illustrated particularly.

The head 16 mounts a vertically elongated brass tube or sleeve 18 having a longitudinal sight aperture 19, and a glass cylinder or tube 20 is fixedly arranged within the sleeve 18. The cylinder 20 internally receives the hardened scleroscope hammer element 21 (FIGS. 2 and 3) in the usual fashion, the hammer being held by vacuum at the top of the cylinder 20 preceding and following the test cycle. The vacuum is preferably controlled in a conventional way by means of a solenoid actuated valve, which valve (not shown) is effective to establish the hammer holding vacuum when its control solenoid is electrically de-energized. Upon energization the vacuum is broken and the hammer 21 descends, thereafter occupying the dot-dash and dotted line positions indicated in FIGS. 2 and 3 in accordance with the acceptability of the tested part 14 as to hardness.

A coil housing 22 (FIG. 1) is mounted for vertical adjustment in relation to the glass scleroscope cylinder 20, as on vertical rods 23 associated with the head 16, this housing carrying an indicator 24 for coaction with a calibrated height scale 25. The vertical setting of the housing in relation to the scale is made in the usual manner, in accordance with the "accept" and "reject" limits desired. An electrical connector 26 is applied to the top of housing 22 to bring in leads for coils, to be described. Likewise, the reference numeral 27 generally designates a cylinder vacuum valve control of the solenoid type for the purpose referred to above.

Referring now to FIGS. 2 and 3 of the drawings, the coupling 26 affords leads 29, 30 and 31 for a pair of sensing coils 32 and 33, having a common connection with the lead 30. These coils are appropriately mounted by the housing 22 in surrounding relation to the hammer cylinder 20, in a manner depicted diagrammatically in FIGS. 2 and 3, involving the glass cylinder encircling spool element 34 movable within the sleeve 18.

A resistor 33' which is shown connected across the ends of the coil 33 has no real bearing on the improved sensing coil circuit. It is merely for the protection of the tube 61, so that when the coils are disconnected, as at the four conventionally shown plug or jack connections, the grid of the tube 61 will not be left floating.

The sensing coil circuit is completed by a resistor 33″ and a capacitor 33''' series connected between one end of coil 33 and the alternating current source of the sensing circuit, i.e. the secondary of the 6.3 volt filament transformer 47 (to be referred to).

As shown in FIGS. 2 and 3, the electrical circuit (itself illustrated in FIG. 4) includes a conducting band 35 applied to the lower, probe end of the tubing structure of the unit 10, i.e., to the lower end of the sleeve 18, with an insulator 35' interposed and with a lead 36 of the circuit applied to the band 35, as shown. Thus, the circuit is completed by grounding through the tested part 14 during the duration of the test cycle, as indicated at 37.

With reference to FIG. 4 of the drawings, only the major operating components and connections of the electronic control circuit are designated by reference numerals, and necessary associated electrical components such as resistors, capacitors and the like are provided in the circuitry in a manner and for purposes which will be apparent to those skilled in the art.

The circuit is supplied from an appropriate alternating current source through a transformer 39, with the supply terminals of a standard rectifier 40 connected across the output leads 41, 42 of the transformer secondary. The rectifier output leads 43, 44 thus afford a source of rectified voltage for the electronic operating components of the circuit, while the secondary output leads 41, 42 supply, under control as will be described, an indicator lamp 45, which indicates the commencement of a test cycle; the coil 46 of the solenoid controlling a vacuum valve of the unit 27 of FIG. 1, by which the hammer 21 is held elevated or released, as referred to; and also a transformer 47 supplying filament voltage and a sensing circuit 48. Current is supplied through the probe coils 32, 33 from the secondary of transformer 47 by the connections shown, which include appropriate capacitor and resistor provisions.

The reference numeral 50 generally designates a cycle starting and timing out control circuit within the overall electronic circuit of the apparatus. Circuit 50 includes a conventional double vacuum triode 51 such as a 6J6, one anode of which is connected through a control relay 52 with the rectified voltage lead 44, and with the corresponding grid biased as shown, the anode in question being specially designated 53. A timing out capacitor 54 and resistor 55 are arranged in the wiring and the second anode 56 of the tube 51 is connected directly to the lead 44. Contacts of the relay 52 are designated by the same reference numerals, primed.

The reference numerals 57 and 58 designate grid controlled gaseous discharge tubes or thyratrons, for example the 2D21, which are, respectively, fired by the drop and rebound of the hammer 21 through the sensing coils. A control relay 59 has its coil connected with a contact 52' of control relay 52, the coil being between the anode of tube 57 and the rectified voltage lead 44. This is a "normally open" contact and it supplies anode voltage to thyratrons 57 and 58 when relay 52 is energized. The "normally closed" contact 52' insures that these thyratrons extinguish after a test (when relay 52 de-energizes) by grounding the anodes of the thyratrons. A further control relay 60 is also connected with another contact 52' of relay 52, between the anode of the thyratron 58 and the rectified voltage lead 44.

The grids of the respective discharge tubes 57, 58 are supplied through a conventional amplifier circuit including a double tube 61 of the 12AX7 type, with the sensing circuit 48 having its output lead 62 connecting the same to the first grid of the amplifier tube 61.

Normally open contacts of respective relays 52 and 59 are series connected, respectively, with the vacuum control solenoid coil 46 and the indicator lamp 45 across the alternating current leads 41, 42. As in the case of the relay 52, the contact of the relay 59 is designated 59'. Relay 60 has its contact provisions connected in the circuitry through which indexing movements of the base 11 of the apparatus, as well as vertical actuation of the probe after each indexing, are controlled. In this respect, the arrangements are not particularly germane to the invention, hence are not illustrated.

In operation, prior to commencement of a testing cycle, the cycle starting relay 52 is de-energized, the testing head 16 is elevated above the tested part 14, so that the ground connection at the probe band 35 is open, and the double vacuum tube 51 is non-conductive. Accordingly, the tubes 57 and 58 lack plate voltage and cannot conduct, hence leaving relays 59 and 60 de-energized. Inasmuch as the contact 52' of relay 52 and the contact 59' of relay 59 are open, the vacuum solenoid coil 46 is de-energized and the lamp 45 is extinguished. The vacuum valve provisions at unit 27 are open, hence hammer 21 is held at the top of the probe cylinder 20.

The operation of the apparatus is instituted by closing an appropriate cycle starting switch (not shown), whereupon the cylinder 20 is automatically lowered onto the first cam part 14 to be tested; upon contacting of the probe with the cam surface, the ground connection is completed at 35, whereupon double triode 51 conducts in the circuit of its plate 53 and closes cycle start relay 52.

As a result, plate voltage is applied to the thyratrons 57 and 58, and the vacuum control solenoid coil 46 is energized, with resultant release of the hammer 21. At the same time, the capacitor 54 starts charging through resistor 55 and, only after a predetermined time sufficient for an "accept" signal to be received, causes triode 51 to conduct through the circuit of its second anode 56.

Upon arrival of the falling hammer at the sensing coil a signal impulse is created in the circuit 48, which is amplified by the amplifier tube 61 and is applied to the grids of thyratrons 57 and 58. Only thyratron 57 fires. This energizes the relay 59, causing the indicator lamp 45 to illuminate, indicating the commencement of a test and the fact that the electronic unit is functioning.

The hammer 21 strikes part 14 and rebounds. If the upward rebound is sufficient to carry the hammer into the sensing coil zone, the part 14 is of satisfactory hardness; if not, the hammer falls short of re-entering the coils. FIG. 2 shows in dot-dash line the downward passage of the hammer through the coil unit; while it is shown in dotted line at the time of impact with the tested cam 14. FIG. 3 shows, in solid line, the re-entry of the hammer into the coil and, in dotted line, a failure of the hammer to reach the coil upon rebound.

Assuming that the part is acceptably hard, a signal impulse originating in the coil unit 32, 33 is amplified by the tube 61 and is impressed on the grid of thyratrons 57 and 58, causing tube 58 to fire and energize control relay 60. This signals acceptability by energizing a green "accept" lamp (not shown) through the contact (not shown) of relay 60 and other suitable circuitry, indicating that for the particular cam part 14 the test is satisfactory.

The "accept" signal also initiates elevation of the test head 16 and causes it to be moved by base 11 to the next cam part to be tested. Upon elevation of the cylinder 20, the grounded probe circuit is open, causing an interruption of conduction in the circuit of the anode 53 of tube 51. Capacitor 54 stops charging and discharges; plate voltage is removed from the thyratrons 57, 58, so that the respective relays 59, 60 drop out. Lamp 45 extinguishes and vacuum valve solenoid coil 46 is de-energized, whereupon the hammer 21 is vacuum elevated to the top of the cylinder 20. De-energization of relay 60 terminates the "accept" signal, and when capacitor 54 loses its accumulated charge (it loses this accumulated charge in a small fraction of the index time), the electronic system is again in its normal condition, ready to start another test cycle.

In the event the hammer does not rebound to the sensing coils, the thyratron 58 fails to fire. Capacitor 54 eventually charges to a voltage which will cause tube 51 to conduct in the circuit of its plate 56, and current flow in this circuit causes the associated tube circuit through plate 53 to stop conducting.

Accordingly, relay 52 drops out, and the subsequent operation is the same as described above under the circumstance in which the probe circuit caused relay 52 to open. Capacitor 54 will start to lose its accumulated charge.

It is seen that two conditions differ from the situation previously described. No "accept" signal has been forwarded, hence the cylinder assembly remains in grounding contact with the part 14, and the "accept" lamp remains dark. After capacitor 54 loses its accumulated charge the relay 52 will again close. The circuit is in its normal condition, ready to make another test, and the unit will automatically start another test, with the operation just described. It will continue to make tests on the same cam part 14 until a test gives an "accept" result, all things being equal.

However, in order to avoid useless repetition, the relay circuitry of the apparatus is provided on its control panel (not shown) with a timing relay (not shown) which is set to lift the cylinder assembly after an interval of time sufficient for a desired number of checks to be made, for example, two. If an "accept" signal is not received in this time interval (i.e. the hammer 21 has not rebounded enough to reenter the sensing coils on either check) the timing relay will cause a red "reject" lamp (not shown) to illuminate, and will also cause the barrel assembly to be raised and shifted longitudinally to the next test position. Breaking of the probe circuit at ground 37 restores the electronic system to its normal condition, as described above, ready to perform another test when the ground connection is again closed.

In reference to the operation of the coil system described above, it is seen that a metal path for flux coupling the two sensing coils 32, 33, as distinguished from the usual inductive air coupling, exists only when the hammer 21 of suitable material having magnetic properties, is within or in the vicinity of the spool 34 on which the coils are wound. The mutual inductance M between the two coils will of course be different when the hammer is additionally coupling them than when it is not. In accordance with the invention the parameters R and C of resistor 33″ and capacitor 33‴ are chosen such that the alternating current voltage appearing between the circuit output terminals (marked X on leads 43 and 62) will be zero or a minimum when the hammer is not so coupling the two coils. The coils 32, 33 will of course have individual resistances $R_1$ and $R_2$. For such a zero or minimum output voltage the following equation must be satisfied:

$$C = \frac{M}{R_1(R+R_2)}$$

where M is the mutual inductance between the coils when uncoupled by the hammer, $R_1$ is the D.C. resistance of coil 32, $R_2$ is the D.C. resistance of coil 33, and R is the value of the resistor 33″, which can actually be zero (although this may impose large requirements on the capacitor 33‴), and C is the capacitance of capacitor 33‴.

This null in the output voltage may be compared with the null from a balanced bridge circuit. However, the coil circuit shown is not in the form of a bridge circuit, either in respect to the manner of connecting the source of voltage or in respect to the fact that the two elements have mutual coupling. When the hammer couples the coils 32, 33, the value of M changes and the above equation is not satisfied. Thus, the output voltage rises above a minimum, and may be amplified and used for any purpose whatsoever, a particular use being to fire a thyratron and close a relay. Accordingly, the presence of the hammer between the coils is reliably detected.

The above circuit has advantages over a bridge-type circuit in that the parameter values are not as critical as in the case of a bridge circuit. Resistor 33″ may be a fixed resistor within a few percent as to actual value or some nominal value. It is not necessary to employ a balancing potentiometer which is critical as to adjustment, as is the case with a bridge circuit. There is nothing to adjust after the circuit is constructed, and huge ratios of output voltage for hammer in-coil condition to hammer not in-coil condition may be obtained. Further, the circuit does not drift off balance after long periods of use.

The equation set forth above represents in the simplest mathematical form a relationship whose applicability can be otherwise proved by an involved mathematical development.

In order to allow the value of capacitance C to be small, resistance R is added as external resistance to that of the coil 33. If resistance R is inserted in series with this unit and $R_2$ represents only the coil resistance of the unit, since the value of mutual inductance M is likely to be unknown, and since $R_1$ and $R_2$ will be determined by the wire resistance of coils 32, 33, a suggested approach in determining the value of R is to choose a capacitance value C and determine by trial and error the value of R which causes zero output voltage from the sensing circuit 48.

The sensing coil circuit, as illustrated in FIGS. 2 and 3 of the drawings, involves the use of but a single set of axially spaced coils 32, 33, and it functions only to determine acceptability of the tested object 14 or its rejectability by reason of insufficient hardness.

The invention provides a detector circuit of general application for the detection of the presence or absence of material that changes the magnetic coupling between two coils (or between two halves of a single center tapped coil), under the principle of null voltage in the absence of such material, or a minimum voltage, increased in value by closer coupling of the coils when the material is present. In order to determine proper values of circuit components to produce the null voltage condition, reference may be had to FIG. 8, a schematic layout in which the coils, resistors, etc., of the circuit are shown in a simplified arrangement. Considerations and computations in this determination are set forth in the following numbered paragraphs:

(1) The value $e_1$ is an A.C. source voltage, or a voltage having a time rate of change. Indicated currents $i_1$ and $i_2$ are supplied by voltage source $e_1$. Coils $L_1$ and $L_2$ are loosely coupled. They need not be wound one on top of the other, but may, for example, be separate coils placed within each other's magnetic field of influence. For example, they may be lined up on the same axis, with the end of one coil being near the end of the other but not necessarily against it; this would be the configuration if each coil were to surround the same glass tube, the coils being either butted against each other or some small distance apart. Also it is apparent that one center tapped coil can replace both $L_1$ and $L_2$, per FIGS. 4 and 5, since each of coils $L_1$ and $L_2$ of FIG. 8 has one end tied to the same common point. Indicated resistances $R_1$ and $R_2$ may be respectively the actual wire resistances of coils $L_1$ and $L_2$, or they may represent the sum of the wire resistance plus any artificially added resistance, fixed or variable, in the form of a resistor connected externally to the coil in each case. For simplicity of analysis it is assumed that $e_3$ is the open circuit output voltage. In other words, no current is drawn from terminals 2—2 by an external load. For example, $e_3$ may be impressed between the control grid and cathode of a properly biased amplifier tube, this constituting an open circuit between terminals 2—2 at low frequencies. The plus signs associated with the time rate of change voltage symbols give relative orientations of these respective voltages and should not be construed as indicating D.C. voltages.

(2) Some very reasonable assumptions may be made that will greatly simplify the analysis of the above circuit. An exact analysis is virtually impossible in view of the complicated mathematical expressions that arise. First we assume that the magnitude of $i_2$ is very much smaller than the magnitude of $i_1$ by virtue of a high reactance for C. We may further assume that $i_2$ is small by choosing a large value of resistance $R_2$. By assuming a small value of current $i_2$ through $L_2$ relative to $i_1$ through $L_1$, the induced voltage effects in $L_1$ due to $i_2$ in $L_2$ may be considered negligible relative to the larger voltage effects in the $i_1$ circuit due to the much larger $i_1$ current. Second, we may assume that $e_1$ across the inductive component of coil $L_1$ is very much smaller in magnitude than is the source voltage $e_1$ if the $L_1/R_1$ time constant is very small relative to the ratio of the maximum of current $i_1$ to the maximum of the time derivative of $i_1$. This may be expressed by the following equations:

(a) $$e_1' \ll e_1$$

provided Equation b is true.

(b) $$\frac{L_1}{R_1} \ll \frac{[i_1]_{max.}}{\left[\frac{di_1}{dt}\right]_{max.}}$$

Voltage $e_2$ induced in $L_2$ is given by:

(c) $$e_2 = M\frac{di_1}{dt}$$

where M is the mutual inductance between coils $L_1$ and $L_2$.

(d) $$e_2' = i_2 R_2$$

(3) It is desired to have $e_3$ zero until such time as some object comes within the vicinity of the coils and changes the mutual inductance M between said coils. When the M changes, it is desired to have a voltage $e_3$ present that may be used to signal the presence of an object (such as magnetic material) in the vicinity of the coils. It is necessary to find a relationship between circuit parameters such that when this relationship is met, $e_3$ will be zero. Since we wish to have $e_3$ zero when the material to be detected is not in the vicinity of above mentioned coils, the relationship between circuit parameters will be found that causes $e_3$ to be zero in the absence of material to be detected. The circuit is made to satisfy these relationships with said material not present. In such case $e_3$ will then be zero. If magnetic material is brought within the vicinity of the coils, the coupling will be increased, M will be larger and the relationships between circuit parameters necessary to cause a null of $e_3$ will not be met and an output voltage $e_3$ will be present.

(e) $$i_1 = \frac{e_1 - e_1'}{R_1}$$

but $e_1' \ll e_1$ by Equation a.

(f) $$\therefore i_1 \simeq \frac{e_1}{R_1}$$

(g) $$\frac{di_1}{dt} \simeq \frac{1}{R_1}\frac{de_1}{dt}$$

from Equation f.

(h) $$e_2 = M\frac{di_1}{dt} \simeq \frac{M}{R_1}\frac{de_1}{dt}$$

by Equations c and g.

(i) $$i_2 = C\frac{d}{dt}(e_1 - e_3) = C\frac{de_1}{dt}$$

since $e_3 = 0$ (j) $$e_3 = 0 = e_2' - e_2$$

Inserting here the value of $e_2'$ given in Equation d and $e_2$ given in Equation h we have:

(k) $$e_3 = 0 = i_2 R_2 - \frac{M}{R_1}\frac{de_1}{dt}$$

But $$i_2 = c\frac{de_1}{dt} \text{ by Equation } i$$

(l) $$\therefore e_3 = 0 = R_2 C\frac{de_1}{dt} - \frac{M}{R_1}\frac{de_1}{dt} = \left[R_2 C - \frac{M}{R_1}\right]\frac{de_1}{dt}$$

(m) $$\therefore R_2 C - \frac{M}{R_1} = 0;\ R_2 C = \frac{M}{R_1}$$

The best approach to achieving the relationships of Equation m between parameters $R_1$, $R_2$, M and C would be the following: Since M is not likely known and since the measurement of M may be somewhat difficult, choose a value of $R_1$ (it may be chosen as the wire resistance of coil $L_1$ or chosen larger than this by adding resistance in series with $L_1$), and choose a value of capacitance C that is convenient. Then experimentally vary $R_2$ until a value is found that causes $e_3$ to null. Since the null is found by experimentally adjusting parameter $R_2$, the tolerance of the $R_1$ and C ratings may be wide. As a matter of fact, a rheostat may constitute part of or all of $R_2$ (see FIG. 8). This rheostat would afford a "balance adjustment" or "null adjustment" that would allow nulling of $e_3$ by variation of resistance, a decided improvement over circuits that must be nulled by variation of inductance values or capacitance.

(4) Another way of looking at the operation of FIG. 8 is as follows: When $$R_2 = \frac{M}{R_1 C}$$

as given in Equation m, the magnitude of $e_2$ equals the magnitude of $e_2'$ and these two cancel as they are in opposition, giving $e_3 = e_2 - e_2 = 0$. The presence of magnetic material in the vicinity of the coils will cause an increase in M and hence an increase in $e_2$ by virtue of $$e_2 = M\frac{di_1}{dt}$$

from Equation h. $e_2$ will not change appreciably and hence cannot cancel $e_2$. Then $e_3 = e_2' - e_2 \neq 0$, and we have an output signal $e_3$.

(5) From Equation 1 it is apparent that $$\left[R_2 C - \frac{M}{R_1}\right] = 0$$

will cause $e_3 = 0$ regardless of the time varying form of $e_1$, provided $e_1$ is not a constant ($e_1$ cannot be D.C.). This means that $e_1$ may have any arbitrary wave shape and need not even be periodic in nature. $e_1$ has not been restricted to sine wave form. However, it would probably be convenient to use a sine wave form for $e_1$, and likely very convenient to have $e_1$ be 60 cycle voltage. For small air coupled coils, the use of 60 cycle sine wave voltage makes all of the assumptions in the above proof very reasonable.

(6) In view of the fact that $e_3 = 0$ whenever $$\left[R_2 C - \frac{M}{R_1}\right] = 0$$

regardless of the form of $e_3$, it is evident that when $e_3$ is periodic, the frequency of $e_3$ is of no consequence, provided that said frequency is low enough to make the assumptions true that were used in finding the circuit parameter relationships that cause a null of $e_3$. Therefore the balance adjustment for nulling $e_3$ is independent of frequency (within a practical range of frequencies). This is a decided advantage for this detector circuit.

(7) Referring back to paragraph 2, it was there stated the reactance of C should be large (obtained by taking C small) and also that $R_2$ should be large. These measures should be taken to insure a small value of $i_2$. From Equation $m$ giving $$R_2C = \frac{M}{R_1}$$

we see that we may take C as small as we wish and $R_2$ as large as we wish, subject only to the restriction that their product be equal to a constant, that constant being $M/R_1$. Thus we may make $i_2$ as small as we wish.

(8) Using a low frequency sine wave for voltage $e_1$ makes Equation $f$ a very good approximation, since the impedance through which $i_1$ flows is $Z_1 = R_1 + j\omega L_1$, where $\omega = 2\pi f$ and $f$ is the low frequency. But a low $f$ makes $\omega$ small, and hence the product $\omega L_1$ is very much smaller than $R_1$ (provided $f$ is low enough). Then $Z_1 \cong R_1$ and $$i_1 \simeq \frac{e_1}{R_1}$$

as given in Equation $f$. With $e_1$ of sine wave form, $i_1$ will be of sine wave form but will lag $e_1$ by some phase angle $\theta$. The expression for $i_1$ would then be $$i_1 = I \max \sin(\omega t - \theta)$$

Use of this expression in Equation $b$ then yields:

(n) $$\frac{L_1}{R_1} \ll \frac{[i_1]_{max.}}{\left[\frac{di_1}{dt}\right]_{max.}} = \frac{I_{max.}}{[I_{max.} \cos(\omega t \theta)]_{max.}} = \frac{I_{max.}}{\omega I_{max.}} = \frac{1}{\omega}$$

But $$\omega = 2\pi f, \therefore \frac{1}{\omega} = \frac{1}{2\pi f}$$

and $n$ gives:

(o) $$\frac{L_1}{R_1} \ll \frac{1}{2\pi f} \text{ or } f \ll \frac{1}{2\pi} \times \frac{R_1}{L_1}$$

This is the same requirement as $\omega L_1 \ll R_1$ that causes $Z_1 = R_1 + j\omega L_1$ to become $Z_1 \cong R_1$.

(9) Since, under balanced conditions, the output voltage at terminals 2—2 (FIG. 8) is zero (or very small) nothing would be upset by connecting terminals 2—2 to a device or circuit that would present an impedance or resistance between these terminals. No current would be drawn from terminals 2—2 by the resistance or impedance since the voltage between these terminals is zero. Since no current flows through the resistance or impedance, the balanced condition of the coils and associated circuitry is not affected. However, when the coil circuit is unbalanced by the presence of magnetic material an output voltage exists whether or not there is a resistive or impedance path between terminals 2—2. The analysis of the circuit wherein it was assumed no current was drawn from terminals 2—2 was for the balanced condition only. No analysis was carried out for the unbalanced condition and it is not necessary to assume no output current from terminals 2—2 in the unbalanced condition. The output voltage between terminals 2—2 may be somewhat less when an impedance or resistance is connected between the terminals than is the output voltage when the terminals 2—2 look into an open circuit. This reduction in voltage would be due to the loading effect of the current drawn. However, a wise choice of impedance or resistance values would allow very little loss of output voltage relative to the unloaded (open circuit) output voltage. A very substantial output voltage can be made to appear across appropriate impedance or resistive components that are connected between terminals 2—2. Hence, the above circuit, with its nulling property and its ability to give an output signal when magnetic material comes within the region of the coils is not restricted to an open circuit output case, but will work also when its output voltage is fed into a device that draws some current, or offers a resistive or impedance load.

The circuit configuration presented in FIG. 8 cannot be construed as being a bridge circuit by any means in view of the fact that operation depends upon mutual coupling between elements of the circuit and also because of the manner in which the driving voltage $e_1$ is connected. In addition, there are five node points instead of four.

This circuit is distinguished from ordinary transformer operation in that the output signal $e_3$ is zero until such time as the coils may become more tightly coupled by the presence of magnetic material, at which time $e_3$ becomes some finite output voltage. The presence of magnetic material within the coil of a simple transformer circuit merely increases the transformer efficiency and causes the voltage on the secondary to increase from some finite value of voltage to a slightly larger value of voltage.

FIG. 6 schematically shows a scleroscope device which is adapted to further determine rejectability by reason of excessive hardness, and to this end a pair of the dual-coil units, such as are shown in FIG. 1, being generally designated by the reference numeral 65, are applied to the cylinder 20, in axially spaced relation to one another, each of the units 65 being electrically connected to an amplifying and control circuit, electronic in character, as shown in FIG. 4, or otherwise. An article rejectable for insufficient hardness will be signaled in the manner described above, or if acceptable signaled as described above. An article of excessive hardness will cause the hammer element to rebound into the upper coil unit 65, with a resultant signal denoting inacceptability.

FIG. 5 of the drawings represents a schematic layout of a sensing and control circuit similar to that of FIG. 4, but with components eliminated which are not essential to a proper description and disclosure of the invention. Similar reference numerals designate corresponding parts, and an extended discussion of FIG. 5 can be dispensed with.

It has a sensing coil unit, generally designated 66, an amplifier section 67 of conventional sort, including the double tube 61 and conventionally indicated associated components, and a scale of two thyratron counter unit, generally designated 68, embodying the thyratrons 57, 58, shown in FIG. 4. An alternating current voltage source will be represented by the transformer 47 of FIG. 4.

Associated with the circuit just referred to is the time delay relay unit 69. The probe connections are not shown but upon contact of the probe conducting band 35 with the piece tested at the commencement of the test a relay circuit is completed at the contacts 70. At the completion of the check the relay contacts are opened so that the thyratrons 57, 58 will be extinguished and will be made ready for the next check.

The scale of two counter 68 on its second count signals "accept" by closing contacts 72 of a relay coil 71 in the plate connection of thyratron 58. Otherwise a "reject" signal issues from the time delay relay 69, which closes after a time delay long enough for a rebound to have given an "accept" signal. Contacts 73 of the relay 71 are energized only on "accept" signals, and their function is to disable the functioning of the time delay relay 69 in the event an "accept" signal is given. If an "accept" signal is not given within the timing out period of the reject relay, a "reject" signal is given by having the reject relay furnish continuity between points Z, Z of FIG. 5.

As will appear from the above description, the invention affords a sensing circuit of particular desirability for incorporation in a scleroscope type hardness testing device. However, it will also be evident to those skilled in the art that the dual-coil unit, operated on the principle of alteration of the mutual inductance of its component coils as effected by the presence or proximity relative thereto of an object having magnetic properties, has more general applicability than this. For example, an application of the principle in a limit switch installation suggests itself, as well as any use for the purpose of indicating an approaching or retreating object having magnetic properties to signal or control an operation of one sort or another. Hence the invention is not to be construed more limitedly than is fairly required by the terminology of the appended claims.

Furthermore, in the particular field of the scleroscope type, rebound hammer testing unit, rebound sensing may be performed using a circuit in which only a single coil is associated with or in encircling relation to the rebound tube 20. For this purpose a simple bridge circuit may be employed, of the character shown in FIG. 7 of the drawings. This involves two coils 75, 76 in connected arms of the bridge and resistors 77, 78 in other arms connected as shown.

Only one of the coils 75, 76 is wound on the tube 20, the other coil being a balancing coil.

The coils 75, 76 are chosen of the same inductance in air, so that the entry of an object with magnetic properties into the coil wound on the tube will change the inductance of that coil, thus unbalancing the bridge and creating a signal. The resistors 77, 78 are chosen of the same value. The connection of the coils 75, 76 is connected by a lead 79 with the first grid of the tube 61, i.e. at the point designated "Y" in FIG. 5. Connections between the respective coils and resistors of the bridge are to the A.C. voltage source 47, as shown.

It is evident that an installation of two axially spaced single coils in a bridge circuit of the general sort shown in FIG. 7, will enable the apparatus to detect over-hardness as well as under-hardness.

As described above, the phenomena of coil inductance and mutual inductance is the essence of the operation of the improved sensing device of the invention, a like application of the phenomena of capacitance and eddy-current change may suggest itself to those skilled in the art. It is desired that the invention be construed to cover a resort to either of these reactance phenomena, unless otherwise indicated in the claims to follow.

What we claim as our invention is:

1. An electronic hardness testing apparatus, comprising a source of alternating current voltage, an impact element having a magnetic property and adapted to gravitationally strike and rebound from an object tested, an electric coil unit electrically connected to and supplied by said source and disposed adjacent the drop and rebound path of said element, including a pair of coils electrically responsive, in respect to an alteration in their magnetic coupling by said element in said drop and rebound, and signaling circuitry connected to said coil unit and having an electrical input from the latter as determined by an alteration of said magnetic coupling of said coil unit, said circuitry including resistive and reactive components of fixed selected value connecting the output of only one of said coils of said source, the parameters of said components being chosen such that the voltage output of said coil unit is substantially a null when said coils are not so coupled.

2. An electronic hardness testing apparatus, comprising an impact element housed in a tubular device and having a magnetic property, said element being adapted to gravitationally strike and rebound in said tubular device from an object tested, an electric coil unit mounted on said device adjacent to the drop and rebound path of said element, said coil unit including a pair of coils positioned within the upper and lower limits of the drop and rebound movement of said element, said coils being wired in a common electrical circuit in which they are altered as to magnetic coupling by the presence of said impact element in their magnetic field, and signaling circuitry connected to said coil unit and receiving an input voltage therefrom as the result of a change in its mutual inductance by said alteration in coil coupling.

3. An electronic hardness testing apparatus, comprising an impact element housed in a tubular probe device and having a magnetic property, said element being adapted to gravitationally strike and rebound in said tubular device from an object tested, an electric coil unit mounted on said device adjacent to the drop and rebound path of said element, said coil unit including a pair of coils positioned within the upper and lower limits of the drop and rebound movement of said element, said coils being wired in a common electrical circuit in which they are altered as to magnetic coupling by the presence of said impact element in their magnetic field, and signaling circuitry connected to said coil unit and receiving an input voltage therefrom as the result of a change in its mutual inductance by said alteration in coil coupling, said probe device having a contact wired in said common electrical circuit and completing a circuit through the object tested when said probe device is engaged therewith.

4. An electronic hardness testing apparatus, comprising an impact element housed in a tubular probe device and having a magnetic property, said element being adapted to gravitationally strike and rebound in said tubular device from an object tested, an electric coil unit mounted on said device adjacent to the drop and rebound path of said element, said coil unit including a pair of coils positioned within the upper and lower limits of the drop and rebound movement of said element, said coils being wired in a common electrical circuit in which they are altered as to magnetic coupling by the presence of said impact element in their magnetic field, and signaling circuitry connected to said coil unit and receiving an input voltage therefrom as the result of a change in its mutual inductance by said alternation in coil coupling, said probe device having a contact wired in said common electrical circuit and completing a circuit through the object tested when said probe device is engaged therewith, said coil unit being mounted for adjustment axially of said device.

5. Hardness testing apparatus in accordance with claim 2, in which said common circuit includes resistive and capacitative components whose parameters are chosen such that the voltage output of said coil unit is at a minimum when said coils are not altered as to coupling by said impact element.

6. Apparatus in accordance with claim 5, in which said minimum output voltage exists with resistance and capacitance parameters chosen in accordance with the following equation:

$$C = \frac{M}{R_1(R + R_2)}$$

where C is the capacitance of said capacitative component, M is the mutual inductance between said coils, $R_1$ and $R_2$ are the individual resistances of the respective coils, and R is the value of the resistive component.

7. Apparatus in accordance with claim 2, in which there are two of said coil units arranged in axially spaced relation to one another along said tubular device.

8. An electronic hardness testing apparatus, comprising a source of alternating current voltage, an impact element housed in a tubular device and having a magnetic property, said element being adapted to gravitationally strike and rebound in said tubular device from an object tested, an electric coil unit mounted on said device adjacent the drop and rebound path of said element, said coil unit including a pair of coils spaced from one another along said device and being electrically responsive to an alteration of their magnetic coupling by said element in said drop and rebound, and signaling circuitry connected to said coil unit and having an electrical input from the latter as determined by an alteration of said magnetic coupling of said coil unit, said circuitry including electrical reaction means of selected fixed value connecting the output of only one of said coils to said source in a manner to cause said input voltage to be a minimum in the absence of a substantial alteration of said magnetic coupling in response to the proximity of said element, said input voltage increasing substantially from said minimum when said magnetic coupling is increased by said element.

9. An electronic hardness testing apparatus, comprising a source of alternating current voltage, an impact element housed in a tubular device and having a magnetic property, said element being adapted to gravitationally strike and rebound in said tubular device from an object tested, an electrical coil unit mounted on said device adjacent the drop and rebound path of said element, said coil unit including a pair of coils spaced from one another along said device and being electrically responsive to an alteration of their magnetic coupling by said element in said drop and rebound, and signaling circuitry connected to said coil unit and having an electrical input from the latter as determined by an alteration of said magnetic coupling of said coil unit, said circuitry including electrical resistive and reactive components of fixed selected value connecting the output of only one of said coils to said source, the parameters of said components being chosen such that the voltage output of said coil unit has substantially a null when said coils are not so coupled.

10. An electronic hardness testing apparatus, comprising a source of alternating current voltage, an impact element housed in a tubular device and having a magnetic property, said element being adapted to gravitationally strike and rebound in said tubular device from an object tested, an electric coil unit mounted on said device adjacent the drop and rebound path of said element, said coil unit including a pair of coils spaced from one another along said device and being electrically responsive to an alteration of their magnetic coupling by said element in said drop and rebound, and signaling circuitry connected to said coil unit and having an electrical input from the latter as determined by an alteration of said magnetic coupling of said coil unit, said circuitry including electrical resistive and reactive components of fixed selected value connecting the output of only one of said coils to said source, the parameters of said components being chosen such that the voltage output of said coil unit has substantially a null when said coils are not so coupled, said tubular device being provided with a contact wired in said circuitry and adapted to be engaged with an object tested to complete a circuit through the latter.

11. A sensing device comprising a source of alternating current voltage, an electric coil unit electrically connected to and supplied by said source and disposed adjacent the path of movement of an element having magnetic properties, said coil unit including spaced coils whose magnetic coupling is altered in response to the degree of proximity of said element to said coil unit, and electrical circuitry connected to said coil unit to receive an input voltage therefrom, said circuitry including electrically reactive means of selected fixed value connecting the output of only one of said coils to said source in a manner to cause said input voltage to be a minimum in the absence of a substantial alternation of said magnetic coupling in response to the proximity of said element, said circuitry including means to additively superpose said last named coil output upon a voltage available from said source when said magnetic coupling is increased by said element.

12. A sensing device comprising a source of alternating current voltage, an electric coil unit electrically connected to and supplied by said source and disposed adjacent the path of movement of an element having magentic properties, said coil unit including spaced coils whose magnetic coupling is altered in response to the degree of proximity of said element to said coil unit, and electrical circuitry connected to said coil unit to receive an input voltage therefrom, said circuitry including electrically reactive means of selected fixed value connecting the output of only one of said coils to said source in a manner to cause said input voltage to be zero in the absence of a substantial alteration of said magnetic coupling in response to the proximity of said element, said circuitry including means to additively superpose said last named coil output upon a voltage available from said source when said magnetic coupling is increased by said element.

References Cited in the file of this patent
UNITED STATES PATENTS

| | | |
|---|---|---|
| 1,490,836 | Lipps | Apr. 15, 1924 |
| 1,780,952 | Symmes | Nov. 11, 1930 |
| 2,147,746 | Luck et al. | Feb. 21, 1939 |
| 2,438,406 | Konet | Mar. 23, 1948 |
| 2,645,341 | Diamond | July 14, 1953 |